June 7, 1955  A. M. HORVATH  2,710,224
TRAILER DUMP TRUCK
Filed April 16, 1952  2 Sheets-Sheet 1
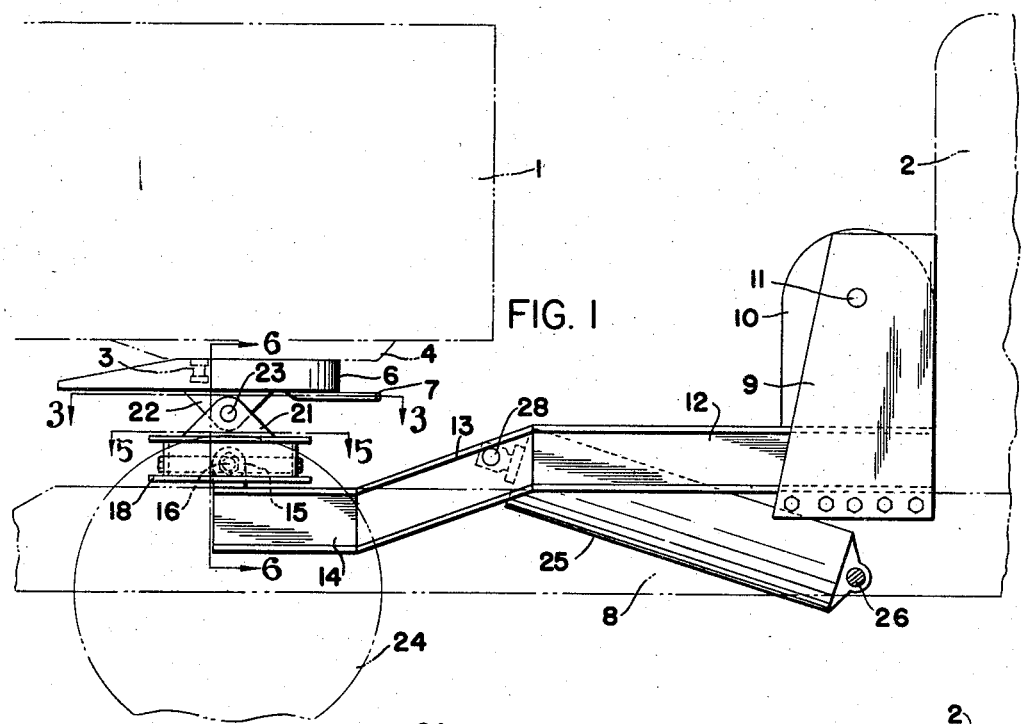
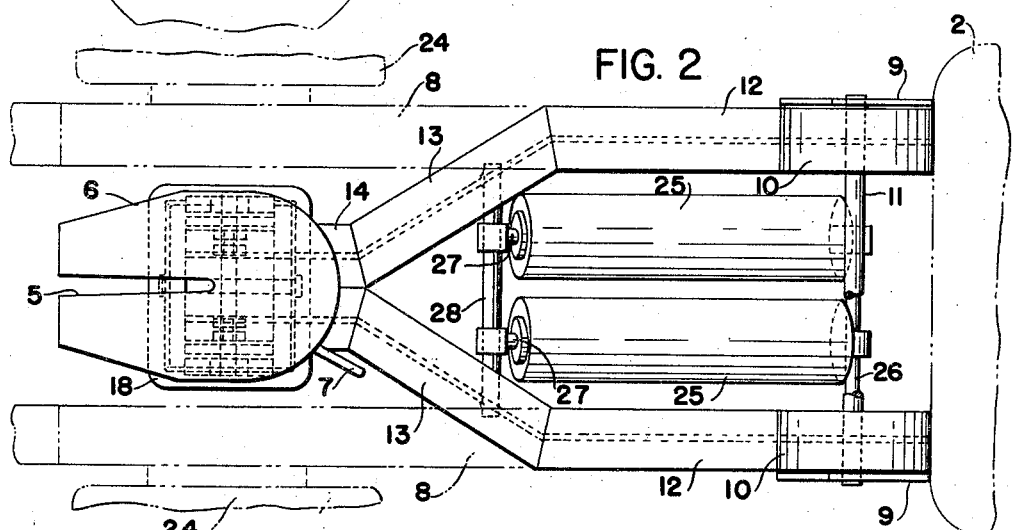
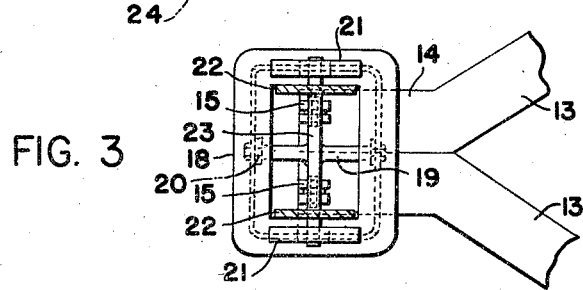
INVENTOR.
ALEXANDER M. HORVATH
BY
*Frank H. Harmon*
ATTORNEY June 7, 1955 — A. M. HORVATH — 2,710,224
TRAILER DUMP TRUCK
Filed April 16, 1952 — 2 Sheets-Sheet 2

*INVENTOR.*
ALEXANDER M. HORVATH
BY
*Frank H. Harmon*
ATTORNEY

United States Patent Office 2,710,224
Patented June 7, 1955

2,710,224

TRAILER DUMP TRUCK

Alexander M. Horvath, Cleveland, Ohio, assignor of twenty per cent to Frank H. Harmon, Cleveland, Ohio, twenty per cent to Thomas A. Grabien, Cleveland, Ohio, twenty per cent to Andrew F. Brooker, Bowling Green, Ohio, and twenty per cent to Hertha Prusha, Berea, Ohio Application April 16, 1952, Serial No. 282,538

5 Claims. (Cl. 298—22)

This invention relates in general to trailer trucks and more particularly to improvements in trailer dump trucks.

The invention concerns itself primarily with trailer trucks that are releasably secured, by what is known in the art as a fifth wheel, to a tractor cab. In addition, the invention also relates to such a trailer that is also adapted to be used as a dump truck, or one whose front end may be elevated so as to discharge the contents of the trailer truck.

In the conventional assembly of this latter type, it has been the practice to specially design the trailer truck to include the equipment for hoisting the front end for dumping purposes.

One of the primary objects of my invention is to provide the tractor cab, not only with the fifth wheel connecting means, but also with all of the trailer hoisting means, so that, without any special equipment on the trailer, I am able to convert any conventional trailer truck into a trailer dump truck.

Another object of my invention is to improve the fifth wheel connection assembly between the cab tractor and the trailer dump truck so as to provide for greater flexibility of connection and for virtual universal limited relative movement about a longitudinal, as well as a transverse, axis.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in side elevation of the front end of the trailer and the rear end of the cab tractor in normal trailing relationship, and also showing the special fifth wheel connecting assembly and the trailer truck hoisting apparatus carried by the cab tractor;

Figure 2 is a top plan view of the assembly shown in Figure 1;

Figure 3 is a view in section taken along line 3—3 of Figure 1 showing the fifth wheel supporting frame carried by a movable frame on the cab tractor;

Figure 4:
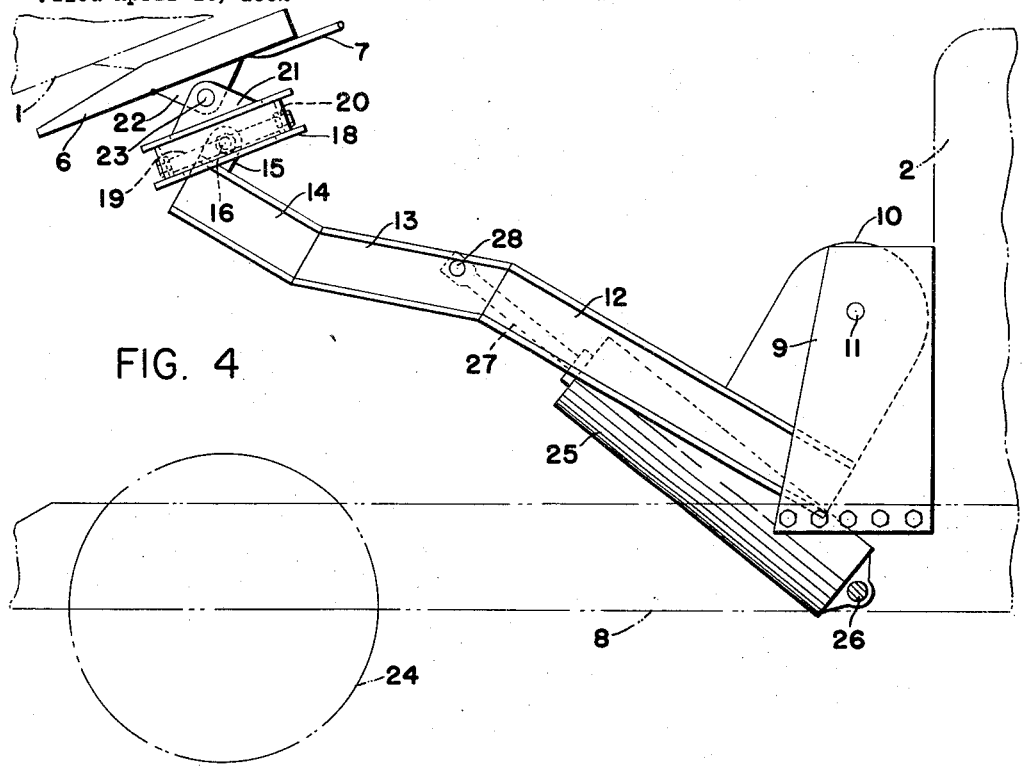
Figure 4 is a view similar to Figure 1, showing the hoisting apparatus in elevated position to hoist the front end of the trailer.
Figure 5:
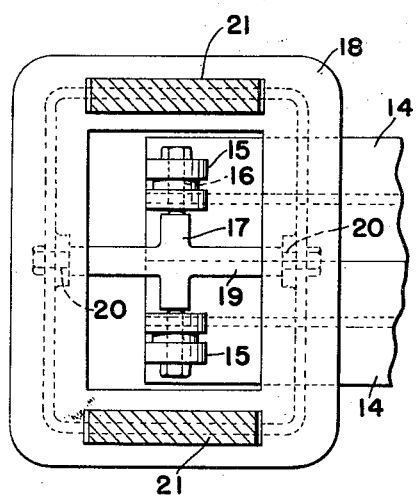
Figure 5 is an enlarged view in section taken along line 5—5 of Figure 1.
Figure 6:
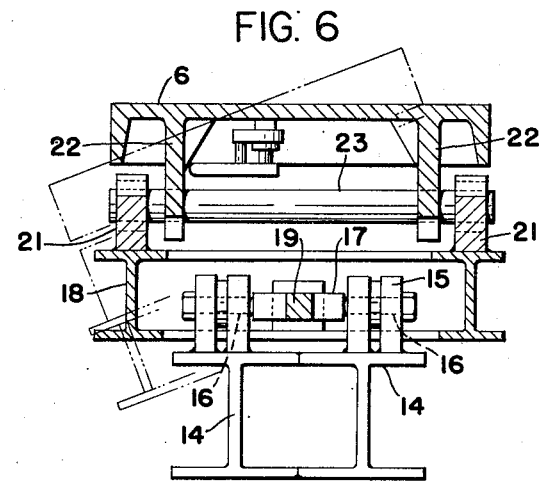
Figure 6 is a view in section taken along line 6—6 of Figure 1, showing the fifth wheel supporting frame in tilted position in dotted lines.

Referring more particularly to the drawings, in Figure 1, the trailer is shown connected to a tractor cab 2, in a normal unelevated trailer position, by means of the usual stud 3 carried by a plate 4 secured to the bottom surface of the trailer body fitting in the usual slot 5 of a fifth wheel 6 and retained by the usual clamping lever 7. The conventional practice in cab tractor and trailer assemblies is to mount the fifth wheel 6 on a transverse pivot. This permits restricted fore and aft rocking action of the fifth wheel and consequent flexibility of connection between the cab tractor and trailer, and also relative movement of the trailer with respect to the fifth wheel about the stud 3 of the trailer as a vertical axis.

The present invention contemplates such an assembly, but in addition, it is designed so that the trailer can also be used as a dump truck by providing means carried by the tractor cab whereby the trailer front end may be bodily lifted so as to dump the contents of the trailer out of the rear end of the trailer. Moreover, the present invention contemplates the mounting on the cab tractor the entire means for elevating the front end of the dump truck trailer. In this manner, no special equipment, in addition to the conventional stud 3, is required of any trailer body in order to convert it into a dump truck.

Having this in mind, I secure to the rear end of the cab tractor 2 a rearwardly extending body frame 8, to which I secure side brackets 9. Inside of these two side brackets 9, I place two spaced vertical posts 10, and pivotally connect them to the side brackets 9 by means of a cross pin 11. Integral, or rigid, with the two vertical posts 10 are two channel beams 12 that extend rearwardly, then downwardly, converging at 13 and terminating into adjacent horizontal parallel sections 14. At the rear of the two beams 14 and on the upper surface thereof are rigidly secured two spaced eye forks 15 which receive a crosspin 16 that is rotatable in a sleeve 17 that is secured to a frame 18. This permits limited rotation of the frame 18 in a fore and aft direction relative to the beams 14 about the transverse axis pin 16. Integral with sleeve 17 is another sleeve 19 that extends at right angles to sleeve 17 and longitudinally of the assembly. Inside of sleeve 19 is a cross pin 20 by means of which the frame 18 is mounted to also have limited relative rotation with respect to beams 14 transversely about pin 20 as a longitudinal axis.

The frame 18, as a whole, has a bracket 21 that is pivotally secured to a bracket 22 of the fifth wheel 6 by means of a transverse pin 23, so as to permit relative rocking between the fifth wheel 6 and the frame 18 in a fore and aft direction about a transverse pivot pin 23.

As stated before, Figure 1 shows the cab tractor and trailer in normal position as a cab tractor and trailer. In Figure 4, I have shown the trailer hoisting apparatus all of which is carried by the cab tractor, in an elevated position to lift the front end of the trailer in dumping position and considerably elevated about the rear wheels 24 of the cab tractor. This I prefer to do by hydraulic means, using any suitable source of hydraulic power and control means. For purposes of illustration, I have shown a pair of hydraulic cylinders 25 pivotally connected by a pin 26 to the cab tractor frame 8 and having slidable pistons mounted therein whose forward piston rods 27 are pivotally connected to the channel beams 13 by means of a cross pin 28. Thus, a supply of hydraulic power to the bottom, or forward, ends of the hydraulic cylinders 25 will cause the piston rods 27 of the hydraulic pistons to be extended rearwardly of the tractor cab. By reason of the three pivotal connections 11, 26 and 28, this results in the lifting of the channel beam construction as well as the frame 18. It follows that this hoisting force is also applied to the fifth wheel and also to the front end of the trailer to make a dump truck out of it with no special equipment on the trailer in addition to the conventional stud 3 for connection to a conventional fifth wheel.

I claim:

1. In combination in a tractor trailer assembly including a tractor and a tractor frame, a trailer releasably connected to said tractor by a fifth wheel connecting assembly for relative movement about vertical axis and about a horizontal transverse axis, a beam supported by said tractor frame and extending longitudinally rearwardly of said tractor and pivotally connected thereto for movement about a horizontal transverse axis, a horizontal transverse axle supported by and pivotally connected to said beam for relative movement about a horizontal transverse axis, a second axle rigid with said first axle and extending at right angles thereto to be horizontally longitudinally disposed, a frame pivotally connected to said second axle for relative movement about a horizontal longitudinal axis, said frame being connected to said fifth wheel assembly to support the same and fluid power piston and cylinder operating means horizontally transversely pivotally connected to said beam and said tractor frame for hoisting said beam, frame, fifth wheel assembly and the front end of said trailer for dumping the contents thereof.

2. In combination in a tractor trailer assembly including a tractor and a tractor frame, a trailer releasably connected to said tractor by a fifth wheel connecting assembly for relative movement about a vertical axis and about a horizontal transverse axis, a beam supported by said tractor frame, and extending longitudinally rearwardly of said tractor and pivotally connected thereto for movement about a horizontal transverse axis, a horizontal transverse axle supported by and pivotally connected to said beam for relative movement about a horizontal transverse axis, a second axle rigid with said first axle and extending at right angles thereto to be horizontally longitudinally disposed, a frame pivotally connected to said second axle for relative movement about a horizontal longitudinal axis, said frame being pivotally connected to said fifth wheel assembly to support the same and means horizontally transversely pivotally connected to said beam and said tractor frame for hoisting said beam, frame, fifth wheel assembly and the front end of said trailer for dumping the contents thereof.

3. In combination in a tractor trailer assembly including a tractor and a tractor frame, a trailer releasably connected to said tractor by a fifth wheel connecting assembly for relative movement about a vertical axis and about a horizontal transverse axis, a beam supported by said tractor frame and extending longitudinally rearwardly of said tractor and pivotally connected thereto for movement about a horizontal transverse axis, a horizontal transverse axle supported by and pivotally connected to said beam for relative movement about a horizontal transverse axis, a second axle supported by said first axle and extending at right angles thereto to be horizontally longitudinally disposed, a frame pivotally connected to said second axle for relative movement about a horizontal longitudinal axis, said frame being connected to said fifth wheel assembly to support the same and means horizontally transversely pivotally connected to said beam and said tractor frame for hoisting said beam, frame, fifth wheel assembly and the front end of said trailer for dumping the contents thereof.

4. In combination in a tractor trailer assembly including a tractor and a tractor frame, a trailer releasably connected to said tractor by a fifth wheel connecting assembly for relative movement about a vertical axis and about a horizontal transverse axis, a beam supported by said tractor frame and extending longitudinally rearwardly of said tractor and pivotally connected thereto for movement about a horizontal transverse axis, a horizontal transverse axle supported by and pivotally connected to said beam for relative movement about a horizontal transverse axis, a second axle supported by said first axle and extending at right angles thereto to be horizontally longitudinally disposed, a frame pivotally connected to said second axle for relative movement about a horizontal longitudinal axis, said frame being pivotally connected to said fifth wheel assembly for relative movement about a horizontal transverse axis and means horizontally transversely pivotally connected to said beam and said tractor frame for hoisting said beam, frame, fifth wheel assembly and the front end of said trailer for dumping the contents thereof.

5. In combination in a tractor trailer assembly including a tractor and a tractor frame, a trailer releasably connected to said tractor by a fifth wheel connecting assembly for relative movement about a vertical axis and about a horizontal transverse axis, a beam supported by said tractor frame and extending longitudinally rearwardly of said tractor and pivotally connected thereto for movement about a horizontal transverse axis, a horizontal transverse axle supported by and pivotally connected to said beam for relative movement about a horizontal transverse axis, a second axle supported by said first axle and extending at right angles thereto to be horizontally longitudinally disposed, a frame pivotally connected to said second axle for relative movement about a horizontal longitudinal axis, said frame being pivotally connected to said fifth wheel assembly for relative movement about a horizontal transverse axis and fluid power piston and cylinder operating means horizontally transversely pivotally connected to said beam and said tractor frame for hoisting said beam, frame, fifth wheel assembly and the front end of said trailer for dumping the contents thereof.

References Cited in the file of this patent

UNITED STATES PATENTS

| | | |
|---|---|---|
| 1,652,262 | Waller | Dec. 13, 1927 |
| 2,018,838 | Connors | Oct. 29, 1935 |
| 2,027,098 | Helms | Jan. 7, 1936 |
| 2,522,385 | Lindsay | Sept. 12, 1950 |